US009378609B2

(12) United States Patent
Burke et al.

(10) Patent No.: US 9,378,609 B2
(45) Date of Patent: Jun. 28, 2016

(54) WAGERING GAME ESTABLISHMENT OFFER TAILORING

(75) Inventors: Mary M. Burke, Somonauk, IL (US); Joel R. Jaffe, Glenview, IL (US); Shridhar P. Joshi, Naperville, IL (US); Daniel P. Louie, Chicago, IL (US); Matthew J. Ward, Northbrook, IL (US); Brian L. Yarger, Arlington Heights, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 1058 days.

(21) Appl. No.: 13/392,280

(22) PCT Filed: Aug. 24, 2010

(86) PCT No.: PCT/US2010/046560

§ 371 (c)(1),
(2), (4) Date: Feb. 24, 2012

(87) PCT Pub. No.: WO2011/025796

PCT Pub. Date: Mar. 3, 2011

(65) Prior Publication Data

US 2012/0157191 A1 Jun. 21, 2012

Related U.S. Application Data

(60) Provisional application No. 61/236,684, filed on Aug. 25, 2009.

(51) Int. Cl.
*G06F 19/00* (2011.01)
*G07F 17/32* (2006.01)

(52) U.S. Cl.
CPC ............ *G07F 17/32* (2013.01); *G07F 17/3237* (2013.01); *G07F 17/3255* (2013.01)

(58) Field of Classification Search
None
See application file for complete search history.

(56) References Cited

U.S. PATENT DOCUMENTS 6,179,710 B1 * 1/2001 Sawyer et al. .................. 463/16
6,267,671 B1 * 7/2001 Hogan ............................ 463/25

(Continued)

FOREIGN PATENT DOCUMENTS

WO 2011025796 3/2011
WO WO-2011025796 3/2011

OTHER PUBLICATIONS

"PCT Application No. PCT/US10/46560 International Preliminary Report on Patentability", Sep. 28, 2011 , 18 pages.

(Continued)

*Primary Examiner* — Paul A D'Agostino
(74) *Attorney, Agent, or Firm* — DeLizio Law, PLLC

(57) ABSTRACT

A system determines that current wagering game establishment activity data of a user satisfies wagering game establishment offer evaluation criteria (401). The system accesses, over a network, past activity data of the user at least partially in response to determining that the current wagering game establishment activity data of the user satisfies the wagering game establishment offer evaluation criteria (403). The system analyzes the past activity data based, at least in part, on a desired effect and the current wagering game establishment activity data (405). The system computes likelihood that at least one of a set of offers can achieve the desired effect based on the analysis result (407). The system selects a first of the set of offers based, at least in part, on determining the likelihood that at least one of the set of offers can achieve the desired effect (409). The system presents the selected first offer to the user (413).

24 Claims, 10 Drawing Sheets

(56) References Cited

U.S. PATENT DOCUMENTS

| | | | | |
|---|---|---|---|---|
| 6,939,234 | B2 | 9/2005 | Beatty | |
| 7,384,338 | B2 | 6/2008 | Rothschild et al. | |
| 8,282,488 | B2 * | 10/2012 | Walker et al. | 463/41 |
| 8,979,646 | B2 * | 3/2015 | Moser et al. | 463/29 |
| 2002/0107728 | A1 * | 8/2002 | Bailey et al. | 705/14 |
| 2002/0107729 | A1 * | 8/2002 | Katz | 705/14 |
| 2002/0151366 | A1 * | 10/2002 | Walker et al. | 463/42 |
| 2003/0003988 | A1 * | 1/2003 | Walker et al. | 463/21 |
| 2003/0013516 | A1 * | 1/2003 | Walker et al. | 463/25 |
| 2003/0036425 | A1 * | 2/2003 | Kaminkow et al. | 463/25 |
| 2004/0053681 | A1 * | 3/2004 | Jordan et al. | 463/20 |
| 2006/0122881 | A1 * | 6/2006 | Walker et al. | 705/14 |
| 2007/0004519 | A1 * | 1/2007 | Swart et al. | 463/43 |
| 2007/0015569 | A1 * | 1/2007 | Norton et al. | 463/25 |
| 2007/0060274 | A1 * | 3/2007 | Rowe et al. | 463/16 |
| 2007/0060303 | A1 * | 3/2007 | Govender et al. | 463/25 |
| 2007/0087834 | A1 * | 4/2007 | Moser et al. | 463/42 |
| 2007/0106553 | A1 * | 5/2007 | Jordan et al. | 705/14 |
| 2007/0243935 | A1 * | 10/2007 | Huizinga | 463/42 |
| 2008/0006996 | A1 * | 1/2008 | Frankel et al. | 273/142 R |
| 2008/0007002 | A1 * | 1/2008 | Frankel et al. | 273/292 |
| 2008/0090645 | A1 * | 4/2008 | Walker et al. | 463/25 |
| 2008/0167106 | A1 * | 7/2008 | Lutnick et al. | 463/16 |
| 2008/0274792 | A1 * | 11/2008 | Walker et al. | 463/25 |
| 2008/0274798 | A1 * | 11/2008 | Walker et al. | 463/25 |
| 2009/0018996 | A1 * | 1/2009 | Hunt et al. | 707/2 |
| 2009/0048022 | A1 * | 2/2009 | Iddings et al. | 463/42 |
| 2009/0070081 | A1 * | 3/2009 | Saenz et al. | 703/2 |
| 2009/0124370 | A1 * | 5/2009 | Walkwitz et al. | 463/27 |
| 2009/0131143 | A1 * | 5/2009 | Kelly | 463/19 |
| 2009/0170608 | A1 * | 7/2009 | Herrmann et al. | 463/42 |
| 2009/0191962 | A1 * | 7/2009 | Hardy et al. | 463/29 |
| 2009/0254971 | A1 * | 10/2009 | Herz et al. | 726/1 |
| 2010/0048302 | A1 * | 2/2010 | Lutnick et al. | 463/42 |
| 2010/0240443 | A1 * | 9/2010 | Baerlocher et al. | 463/25 |
| 2011/0106607 | A1 * | 5/2011 | Alfonso et al. | 705/14.25 |

OTHER PUBLICATIONS

"PCT Application No. PCT/US10/46560 International Search Report", Oct. 18, 2010 , 9 pages.

"PCT Application No. PCT/US10/46560 International Preliminary Report on Patentability", Sep. 28, 2011, 18 pages.

"PCT Application No. PCT/US10/46560 International Search Report", Oct. 18, 2010, 9 pages.

* cited by examiner

WAGERING GAME ESTABLISHMENT OFFER TAILORING

RELATED APPLICATIONS

This application claims the priority benefit of U.S. Provisional Application Ser. No. 61/236,684 filed Aug. 25, 2009.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to wagering game establishment systems, and more particularly to wagering game establishment systems that tailor offers based on a current patron context and past patron activity data.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options.

Wagering game establishments collect data with player accounts to enhance the entertainment/experience provided to patrons of the wagering game establishments. The wagering game establishments attempt to use the collected data to tailor the entertainment/experience for each patron. Wagering game establishments make various offers (e.g., coupons) to patrons to enhance the entertainment/experience. Some establishments collect data about ultimate disposition of the offers.

SUMMARY

In some embodiments, a method comprises determining that current wagering game establishment activity data of a user satisfies wagering game establishment offer evaluation criteria. Past activity data of the user is accessed, over a network, at least partially in response to said determining that the current wagering game establishment activity data of the user satisfies the wagering game establishment offer evaluation criteria. The past activity data is analyzed based, at least in part, on a desired effect and the current wagering game establishment activity data to generate an analysis result. Likelihood that at least one of a set of offers can achieve the desired effect is computed based, at least in part, on the analysis result. A first of the set of offers is selected based, at least in part, on said determining the likelihood that at least one of the set of offers can achieve the desired effect. The selected first offer is then presented to the user.

In some embodiments, said determining the likelihood that at least one of the set of offers can achieve the desired effect based, at least in part, on the analysis result comprises computing confidence values for the set of offers based on the desired effect and the analysis result. The confidence values represent the likelihood that respective ones of the set of offers can achieve the desired effect if provided.

In some embodiments, said selecting the first of the set of offers comprises determining that the first of the set of offers has a greatest of the confidence values.

In some embodiments, the method further comprises determining that a first of the set of confidence values exceeds a confidence value threshold. The first confidence value corresponds to the first offer.

In some embodiments, said analyzing the past activity data based, at least in part, on a desired effect and the current wagering game establishment activity data to generate the analysis result comprises determining a plurality of same or similar series of wagering game establishment activities in the past activity data that suggest a pattern of activity. It is also determined if the pattern of activity correlates with the desired effect in a context of the current wagering game establishment activity data.

In some embodiments, said analyzing the past activity data based, at least in part, on a desired effect and the current wagering game establishment activity data to generate the analysis result comprises applying a heuristic to the past activity data and the current wagering game establishment activity data.

In some embodiments, the method further comprises modifying the first offer based, at least in part, on the analysis result to increase the likelihood that the first offer can achieve the desired effect.

In some embodiments, the method further comprises determining that the likelihood that the first offer can achieve the desired effect is insufficient. The modifying the first offer is in response to said determining that the likelihood that the first offer can achieve the desired effect is insufficient.

In some embodiments, the current wagering game establishment activity data and the past activity data comprises at least one of wagering game data and non-wagering game data.

In some embodiments, the non-wagering game data comprises at least one of purchasing data, lodging data, companion data, preferred beverage data, preferred food data, and entertainment data.

In some embodiments, the method further comprises determining a set of players associated with the user based, at least in part, on the past activity data of the user. The past activity data of the set of players is accessed. The past activity data of the set of players and current wagering game establishment activity data of the set of players is analyzed. For each of the set of players, a likelihood that the first of the set offers will achieve a second desired effect is computed. The first of the set of offers is presented to those of the set of players with the likelihood that the first of the set of offers can achieve the second desired effect that surpasses an offer threshold.

In some embodiments, the second desired effect comprises participating in a tournament with the user.

In some embodiments, a method comprises analyzing past wagering game establishment activity data of a user in a context of current wagering game establishment activity data of the user and based, at least in part, on a desired offer effect in response to satisfaction of offer evaluation criteria by the current wagering game establishment activity data; selecting a plurality of offer elements based, at least in part, on said analyzing; building an offer with a likelihood to achieve the desired offer effect; and presenting the offer to the user. The offer is built with the plurality of offer elements.

In some embodiments, the method further comprises determining that the likelihood surpasses a likelihood threshold for presenting the offer.

In some embodiments, the method further comprises determining that the likelihood of the offer to achieve the desired offer effect is insufficient; and changing at least one of the plurality of offer elements used to build the offer to increase the likelihood that the offer can achieve the desired effect.

In some embodiments, the method further comprises detecting satisfaction of the offer evaluation criteria by the current wagering game establishment activity data.

In some embodiments, an apparatus comprises a processor; a machine-readable medium; means for analyzing past wagering game establishment activity data of at least one user in a context of current wagering game establishment activity data of the at least one user; and means for computing that a first offer will have a greater likelihood of achieving a desired effect than a second offer based, at least in part, on output of the analyzing means.

In some embodiments, the apparatus further comprises modifying the first offer to increase the likelihood of the first offer to achieve the desired offer effect.

In some embodiments, the first offer comprises at least one of access to a level in a wagering game, an accomplishment in a wagering game, a beverage related offer, a food related offer, an entertainment related offer, invitation to an impromptu tournament, a preview of a wagering game, access to an early release of a wagering game, and free plays of a wagering game.

In some embodiments, the apparatus further comprises means for presenting the first offer to a user.

In some embodiments, one or more machine-readable media having instructions which, when executed by a processor, cause the processor to perform operations that comprise determining that current wagering game establishment activity data of a user satisfies wagering game establishment offer evaluation criteria; accessing, over a network, past activity data of the user at least partially in response to said determining that the current wagering game establishment activity data of the user satisfies the wagering game establishment offer evaluation criteria; analyzing the past activity data based, at least in part, on a desired effect and the current wagering game establishment activity data to generate an analysis result; computing likelihood that at least one of a set of offers can achieve the desired effect based, at least in part, on the analysis result; selecting a first of the set of offers based, at least in part, on said determining the likelihood that at least one of the set of offers can achieve the desired effect; and presenting the selected first offer to the user.

In some embodiments, said operation of determining the likelihood that at least one of the set of offers can achieve the desired effect based, at least in part, on the analysis result comprises computing confidence values for the set of offers based on the desired effect and the analysis result. The confidence values represent the likelihood that respective ones of set of offers can achieve the desired effect if provided.

In some embodiments, said operation of selecting the first of the set of offers comprises determining that the first of the set of offers has a greatest of the confidence values.

In some embodiments, the operations further comprise determining that a first of the set of confidence values exceeds a confidence value threshold. The first confidence value corresponds to the first offer.

In some embodiments, said operation of analyzing the past activity data based, at least in part, on a desired effect and the current wagering game establishment activity data to generate the analysis result comprises determining a plurality of same or similar series of wagering game establishment activities in the past activity data that suggest a pattern of activity; and determining if the pattern of activity correlates with the desired effect in a context of the current wagering game establishment activity data.

In some embodiments, the operations further comprise modifying the first offer based, at least in part, on the analysis result to increase the likelihood that the first offer can achieve the desired effect.

In some embodiments, the operations further comprise determining that the likelihood that the first offer can achieve the desired effect is insufficient. Modifying the first offer is in response to said determining that the likelihood that the first offer can achieve the desired effect is insufficient.

In some embodiments, the current wagering game establishment activity data and the past activity data comprises at least one of wagering game data and non-wagering game data.

In some embodiments, the non-wagering game data comprises at least one of purchasing data, lodging data, companion data, preferred beverage data, preferred food data, and entertainment data.

BRIEF DESCRIPTION OF THE FIGURES

Embodiments of the invention are illustrated in the Figures of the accompanying drawings in which.

DESCRIPTION OF THE EMBODIMENTS

The description that follows includes exemplary systems, methods, techniques, instruction sequences, and computer program products that embody techniques of the present inventive subject matter. However, it is understood that the described embodiments may be practiced without these specific details. For instance, although examples refer to making offers within a wagering game establishment, offer can be sent to online friends or email accounts. For example, a an offer can be encoded in an e-mail message and sent to a player's email address or presented to a friend of the player who is viewing the player from a remote location online. In other instances, well-known instruction instances, protocols, structures, and techniques have not been shown in detail in order not to obfuscate the description.

Offers of additional spins, access to new game stages, discounts, tickets to shows, different odds or multipliers for a period of time, a better bonus for a period of time or while a condition is satisfied, casino amenities, meals, drinks, etc., can be used to achieve a particular outcome or desired effect, and enhance the entertainment and experience of a patron of a wagering game establishment. The likelihood of achieving a desired effect (e.g., continued game play, participation in a tournament, etc.), can vary as much as individual preferences/inclinations/tendencies vary in different contexts. For instance, an individual may have different preferences on a weekday night after 30 minutes of gaming than the same individual during a weekend when accompanied with friends. A wagering game establishment system can provide a tailored offer to an individual(s) based on analyzing past activity of the individual(s) and on current context as informed by current activity data of the individual(s).

Figure 1:
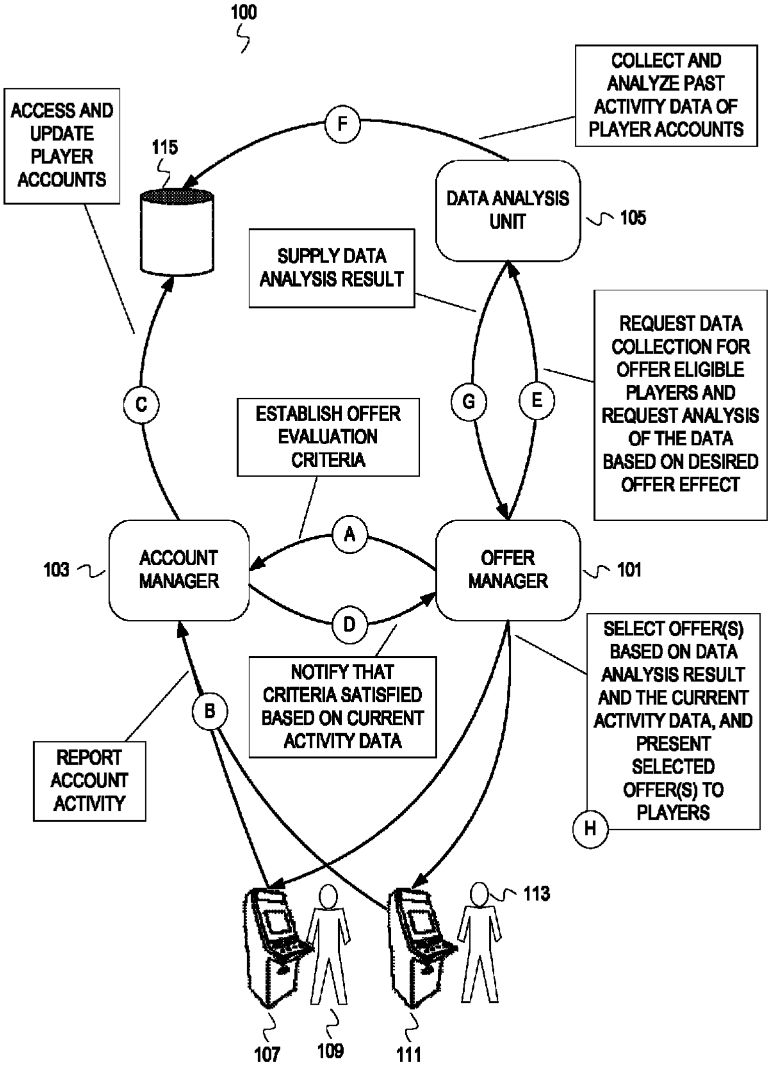
FIG. 1 depicts an example illustration of a system tailoring an offer based on current context and past activity data.

FIG. 1 depicts an example illustration of a system tailoring an offer based on current context and past activity data. A system 100 comprises an account manager 103, an offer manager 101, a data analysis unit 105, and a store 115 of player account data. The system can be implemented in one device, across multiple devices (e.g., several servers in a network), and various permutations thereof. For instance, a first server in a network can embody the account manager 103 and a second server in the network can embody the offer manager 101 and the data analysis unit 105. In FIG. 1, the account manager 103 and the data analysis unit 105 have access to the store 115. Various embodiments can configure access differently and/or utilize intermediaries for various reasons, such as increased security.

At a stage A, the offer manager 101 establishes offer evaluation criteria with the account manager 103. An offer evaluation criterion indicates a criterion for evaluating whether an offer should be offered/presented to a user. Although not necessary, offering an offer is typically contingent upon criteria and not a criterion. The offer manager 101 can establish the offer evaluation criteria with various techniques. For example, the offer manager 101 can register interest in particular data with the account manager 103. As another example, the offer manager 101 can instantiate a process that monitors for current activity data that satisfies the offer evaluation criteria, and associate the process with the account manager 103. The offer evaluation criteria may be partially or entirely default criteria, criteria configured by a user, criteria ascertained with a heuristic by the system 100, etc. Examples of offer evaluation criteria include a certain number of wager events by a player within a given amount of time with a net loss above a particular threshold, a lifetime net gain of a player during certain hours of a certain season, exceeding a wagering event threshold number by a player within a window of time before a show begins, etc.

At stage B, electronic wagering game machines 107 and 111 report current activity data by respective patrons 109 and 113 to the account manager 103. For instance, the patron 109 has logged into a player account at the electronic wagering game machine (EGM) 107, and the patron 113 logs into a player account at the EGM 111. The EGMs 107, 111 exchange messages with the account manager 103 for login. The patrons 109, 113 perform various activities at the EGMs 107, 111 that can include spins, wagers, winning achievements, communicating with friends over a network messenger, ordering beverages, purchasing tickets to a show, etc. The EGMs 107, 111 report data that represents these activities to the account manager 103.

At stage C, the account manager 103 updates the appropriate player accounts in the store 115. The account manager 103 accesses the store 115 (e.g., establishes a secure communication channel with the store or a server that manages the store 115. The account manager updates the player accounts of the patrons 109, 113 to indicate the reported activities.

At stage D, the offer manager is notified that offer evaluation criteria established at stage A are satisfied by activity of at least one of the patrons 109, 113. If several sets of offer evaluation criteria have been established by the offer manager, then the notification can include an identifier of the satisfied one of the sets of evaluation criteria. In addition, the offer manager 101 may be notified that more than one of the several sets of offer evaluation criteria have been satisfied. For example, activity by the patron 109 may satisfy a first of the sets of offer evaluation criteria and activity by the patron 113 may satisfy a second and a third of the sets of offer evaluation criteria. Since the offer evaluation criteria have been satisfied for one or more offers, the offer manager 101 initiates operations to evaluate whether the corresponding offers should be presented to the patron(s) who performed the activities that satisfied the criteria.

At stage E, the offer manager 101 requests a data analysis unit 105 to collect data for offer eligible players and requests the data analysis unit 105 to analyze the collected data based on a desired effect parameter. The patron 109 is an offer eligible player, assuming the patron 109 performed the activities that satisfied offer evaluation criteria for an offer. Assuming that the patron 109 satisfied the offer evaluation criteria for an offer, the offer manager 101 requests collection of past activity data from the player account of the patron 109. The offer manager 101 can make a static request based on configurations (e.g., collect data over the last 60 days). The offer manager 101 can also submit a dynamic request (e.g., determine if the patron 109 is attending a convention that the patron 109 has previously attended, in which case collect data for the time periods of the previous 3 conventions).

At stage F, the data analysis unit 105 collects and analyzes the past activity data of player accounts in accordance with the request from the offer manager 101. The data analysis unit 105 collects past activity data from the player account of the patron 109 in this illustration. The data analysis unit 105 collects data from the player account for the patron 109 for some time period(s) from the store 115. If the desired effect is continued game play, then the data analysis unit 105 analyzes the past activity data to determine patterns that led to particular outcomes. The data analysis unit 105 then correlates the particular outcomes to the desired effect and generates an analysis result. For instance, the data analysis unit 105 may determine that 70% of the patterns that led to game play continuing past two hours involved a combination of beverages and occurred only on weekends. The data analysis unit may have also determined that the patron 109 plays for less than two hours whenever the patron 109 loses $20 in less than 40 minutes and has tickets to a show. As another example, the data analysis unit 105 may determine that the patron 109 continues to play beyond two hours when the patron 113 also plays. This determination may lead the data analysis unit 105 to analyze past activity data in the player account of the patron 113.

At stage G, the data analysis unit 105 supplies the data analysis result to the offer manager 101.

At stage H, the offer manager 101 selects and offer(s) based on the analysis result supplied by the data analysis unit 105 and the current context (i.e., current activity data). For instance, the offer manager 101 may not select an offer for the patron 109 because it is the weekend and the patron 109 has already ordered the combination of beverages, so the patron 109 should continue to play. The offer manager 101 may select an offer for the patron 113 to achieve an outcome of both patrons 109, 113 continuing to play. At stage H, the offer manager also presents the selected offer to the patrons 109, 113. The offer manager 101 can present the offers via the electronic wagering game machines 107, 111, cell phones associated with the patrons 109, 113, etc. Embodiments are not limited to any particular networking technology and can present an offer to a variety of portable devices (e.g., personal data assistants, tablet personal computers, handheld computers, etc.) via a variety of networking technologies (e.g., IEEE 802.11 standards compliant technologies, International Telecommunication Union standards compliant technologies, etc.).

Although examples refer to collecting data, the data analysis unit can analyze the data in the store 115. It is not necessary for the data analysis unit 105 to read the data from the store 115 into another store and/or memory. Further, the operations/responsibilities are not necessarily divided as illustrated in FIG. 1. For instance, embodiments are not required to collect data after determining satisfaction of offer criteria as indicated in stage F. Embodiments can collect data of a player before or while determining satisfaction of criteria. Embodiments can cache predicted relevant data of a player who logs in for evaluation as current data is analyzed/evaluated. The operations performed for offer selection and presentation can vary in implementation.

Figure 2:
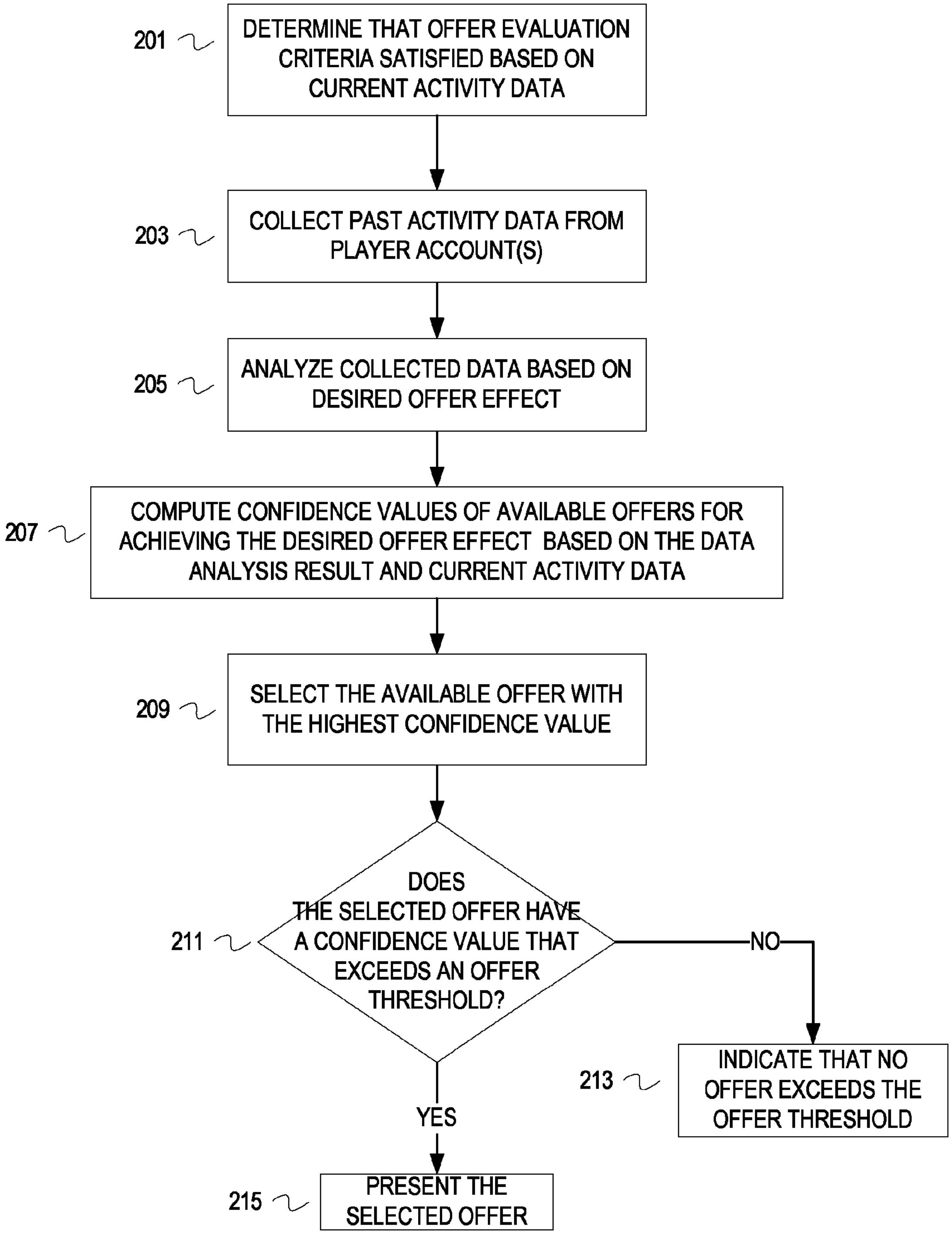
FIG. 2 depicts a flowchart of example operations for presenting an offer based on past activity and current context of a patron.

FIG. 2 depicts a flowchart of example operations for presenting an offer based on past activity and current context of a patron. At block 201, it is determined that offer evaluation criteria are satisfied based on current activity data.

At block 203, past activity data is collected from a player account(s). A wagering game establishment system can access a player account, and read data (e.g., static data, dynamic data). The wagering game establishment system can read data from the player account for a pre-configured time period(s) (e.g., preceding three weekends), a time period(s) based on season (e.g., preceding summer), a time period(s) based on an event (e.g., time periods corresponding to a holiday or convention), static data (e.g., birth date, name, home city, etc.), etc. The wagering game establishment system can also evaluate the player account data, and then determine a time period for data collection. For instance, the wagering game system may determine that the past activity data is insufficient (e.g., there is only a few days worth of data). As another example, the wagering game establishment system can determine that the past activity data of the player account is only sufficiently dense for analysis on Fridays and Saturdays during winter months.

At block 205, the collected data is analyzed based on a desired offer effect. For instance, the wagering game establishment system searches for events that represent an outcome (e.g., log out, cash out, termination of game play, etc.). The system then can analyze activity data of activities that precede the outcome events and determine any correlation among the preceding activities and the outcome events (e.g., analyze activity data in a 5 hour window that precedes the outcome event without being interrupted by a threshold gap of time and/or another outcome event). The wagering game establishment system can build chains of activities that lead to outcome events and find patters or trends that most often lead to outcome events, which correspond to the desired effect. In addition, embodiments can perform the analysis based on a desired offer effect that is comprised of multiple effects to achieve serially or in parallel, and/or embodiments can dynamically change the desired offer effect based on the data analysis. For instance, the wagering game establishment system may determine that the patron enjoys a particular show and tends to engage in more game play after attending the particular show. The desired offer effect can then be modified for that particular patron to comprise 1) the patron attending a show, and 2) the patron playing wagering games after the show. The patron may currently be holding tickets for a show. With the analysis of the past activity data and the current activity data indicating that the patron has purchased a ticket to the particular show, the wagering game establishment system can determine that the past activity data indicates a pattern of the patron to engage in game play after a show. In addition to past activity data of the player account, the wagering game establishment system can collect, analyze and correlate offer redemption data. The offer redemption data may be for the subject patron and/or for the type of offer(s) most relevant to the patron based on the past activity data and the current activity data.

At block 207, confidence values of available offers for achieving the desired offer effect are computed based on the data analysis results and the current activity data.

At block 209, the available offer with the highest confidence value is selected. Embodiments can analyze offer redemption data based on the selected offer.

At block 211, it is determined if the selected offer has a confidence value that exceeds an offer threshold. For instance, the system may not present an offer if the likelihood of achieving the desired offer effect with the selected offer is less than a confidence threshold of 50%. The offer threshold can be configured to be a static threshold, dynamically evolve with changing trends or patterns, vary with context, vary when a collection of offers are presented to a group of patrons, etc. If the selected offer has a confidence value that exceeds the offer threshold, then flow continues to block 215. If the selected offer does not have a confidence value that exceeds the offer threshold, then flow continues to block 213.

At block 213, it is indicated that no offer exceeds the offer threshold. The data can be recorded for learning, adjustment of the threshold, modifications of offers, etc.

At block 215, the selected offer is presented. Examples of presenting an offer include displaying the offer on a wagering game machine display, sending a notification via text messaging to the patron, etc. Embodiments can also present an offer based on a player's contact list and/or preferences. Embodiments can also allow an offer to be shared among players automatically or responsive to a user responding to a notification, based upon account preferences.

Embodiments are not limited to selecting from available offers (e.g., offer that have been predefined by an administrator). Embodiments can create and/or modify offers. FIGS. 3-6 depict adapting available offers to a patron and building offers for a patron.

Figure 3:
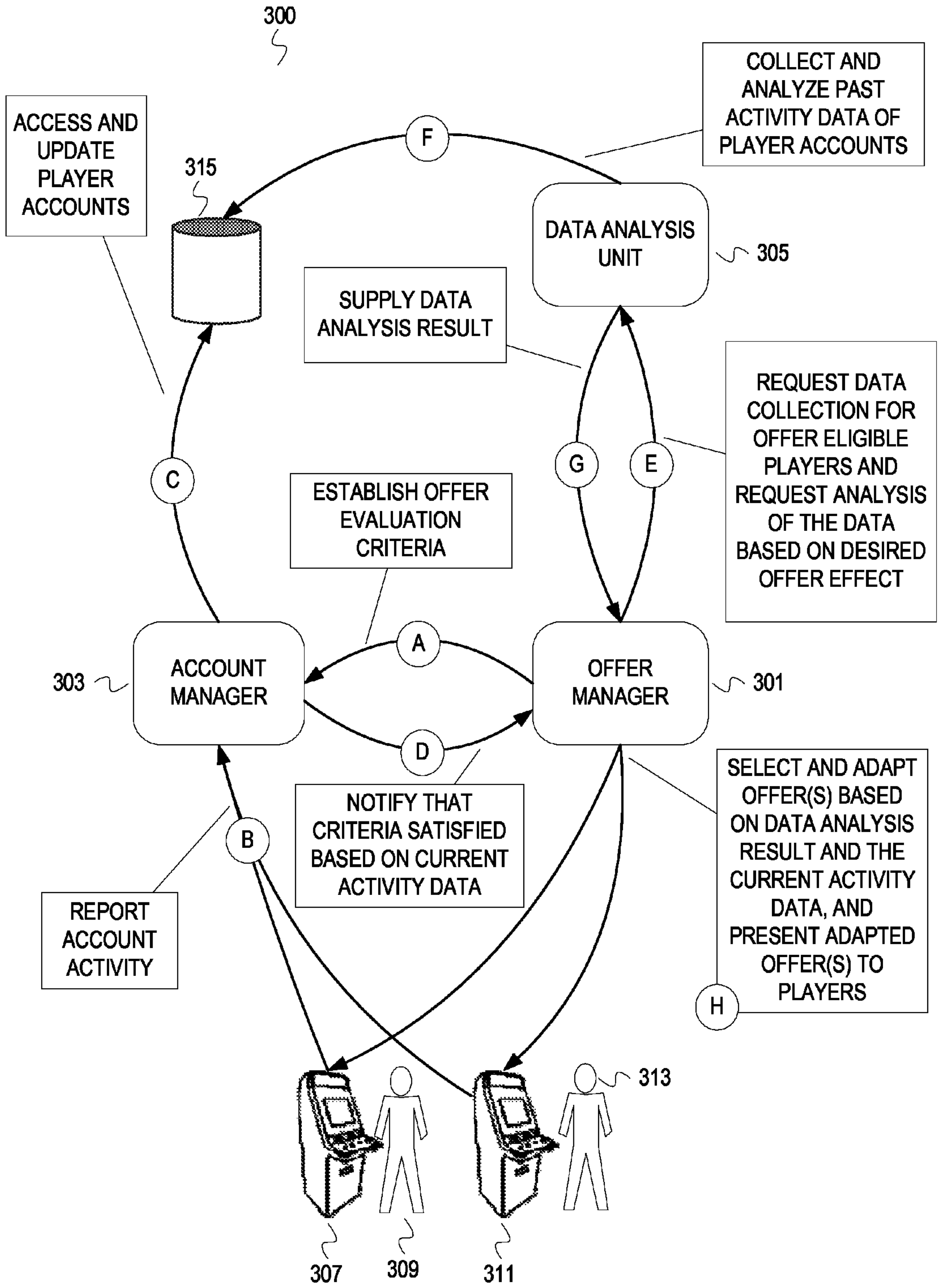
FIG. 3 depicts a conceptual diagram of a system that adapts an offer to a current context of a patron based on past activity data of the patron.

FIG. 3 depicts a conceptual diagram of a system that adapts an offer to a current context of a patron based on past activity data of the patron. A system 300 comprises an account manager 303, an offer manager 301, a data analysis unit 305, and a store 315 of player account data. The system 300 can be implemented in one device, across multiple devices (e.g., several servers in a network), and various permutations thereof. For instance, a first computer in a network can embody the account manager 303, a second computer in the network can embody the offer manager 301, and a third computer can embody the data analysis unit 305. In FIG. 3, the account manager 303 and the data analysis unit have access to the store 315. Various embodiments can configure access differently and/or utilize intermediaries for various reasons, such as increased security.

In FIG. 3, stages A-G are similar to stages A-G of FIG. 1. At a stage A, the offer manager 301 establishes offer evaluation criteria with the account manager 303.

At stage B, electronic wagering game machines 307 and 311 report current activity data by respective patrons 309 and 313 to the account manager 303.

At stage C, the account manager 303 updates the appropriate player accounts in the store 315. The account manager 303 accesses the store 315 (e.g., establishes a secure communication channel with the store or a server that manages the store 315). The account manager updates the player accounts of the patrons 309, 313 to indicate the reported activities.

At stage D, the offer manager 301 is notified that offer evaluation criteria established at stage C are satisfied by activity of at least one of the patrons 309, 313. Since the offer evaluation criteria have been satisfied for one or more corresponding offers, the offer manager 301 initiates operations to evaluate whether the corresponding offers should be presented to the patron(s) who performed the activities that satisfied the criteria.

At stage E, the offer manager 301 requests a data analysis unit 305 to collect data for offer eligible players and requests the data analysis unit 305 to analyze the collected data based on a desired effect parameter. Assuming that the patron 309 satisfied the offer evaluation criteria for an offer, the offer manager 301 requests collection of past activity data from the player account of the patron 309.

At stage F, the data analysis unit 305 collects and analyzes the past activity data of player accounts in accordance with the request from the offer manager 301.

At stage G, the data analysis unit 305 supplies the data analysis result to the offer manager 301.

At stage H, the offer manager 301 selects and adapts an offer(s) based on the analysis result supplied by the data analysis unit 305 and the current context (i.e., current activity data). For instance, the offer manager 301 may select an offer of a discount on a beverage for the patron 309 based on the data analysis result indicating that the patron 309 continues to play after ordering a particular beverage if the patron 309 has at least 5 wins, assuming continued play is the desired offer effect and that the patron 309 has won at least 5 times. The selected offer may be for beverage A, while the data analysis result indicates that the patron 309 prefers beverage B. The offer manager 301 can adapt the offer to the patron 309, and offer a discount on beverage B. As another example, the selected offer may be for a $1 off of beverage A. The offer manager 301 can determine that the patron 309 became a premier player during this gaming session, and adapts the offer to be a free beverage A instead of a discounted beverage B. Also at stage H, the offer manager 301 presents the adapted offer to the patron 309. The offer manager 301 can present the offers via the electronic wagering game machine 307, cell phones associated with the patron 309, etc.

Figure 4:
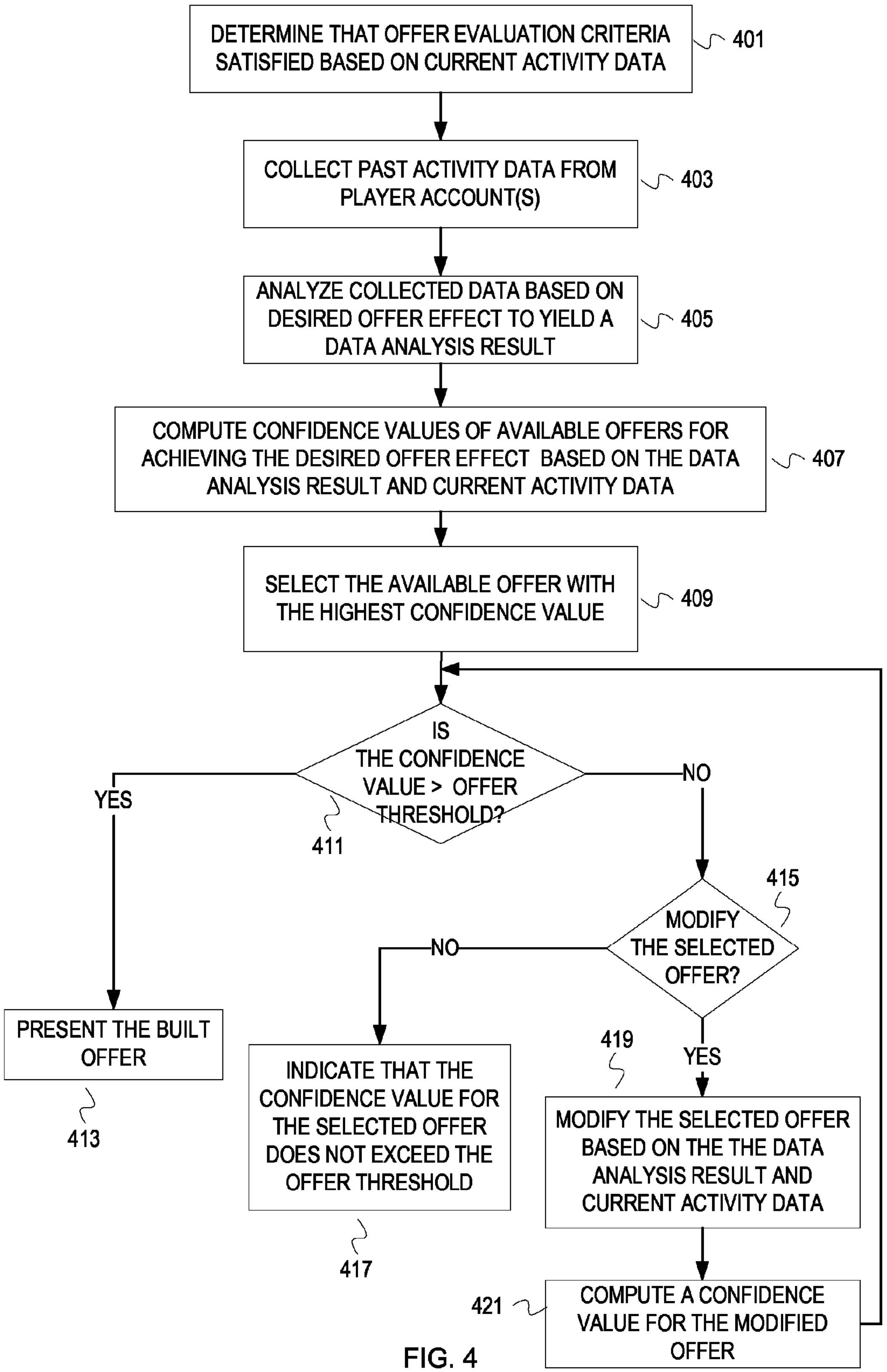
FIG. 4 depicts a flowchart of example operations for adapting an offer to a current context and past activity data.

FIG. 4 depicts a flowchart of example operations for adapting an offer to a current context and past activity data. At block 401, it is determined that offer evaluation criteria have been satisfied based on current activity data.

At block 403, past activity data is collected from a player account(s).

At block 405, the collected data is analyzed based on a desired offer effect.

At block 407, confidence values of available offers for achieving the desired offer effect are computed based on the data analysis results and the current activity data.

At block 409, the available offer with the highest confidence value is selected.

At block 411, it is determined if the selected offer has a confidence value that exceeds an offer threshold. If the selected offer has a confidence value that exceeds the offer threshold, then flow continues to block 413. If the selected offer does not have a confidence value that exceeds the offer threshold, then flow continues to block 415.

At 415, it is determined if the selected offer can be modified. For instance, an administrator and/or offer campaign may have certain restrictions. As another example, certain offer may be flagged as modifiable. The wagering game establishment system can take a default approach of either modifying or not modifying unless the contrary is indicate for any one of the type of offer, the offer cost, patron membership in a players club, past spending levels, etc. If the selected offer can be modified, then control flows to block 419. If the offer cannot be modified, then control flows to block 417.

At block 419, the selected offer is modified based on the data analysis result and the current activity data. For example, the selected offer can be modified to reflect a change in the current context since the offer evaluation was initiated. For instance, the player may have moved to a new wagering game.

At block 421, a confidence value is computed for the modified offer. The confidence value for the modified offer can be computed as a function of the past activity data and more recent current activity data. Control flows from block 421 to block 411.

At block 417, it is indicated that no offer exceeds the offer threshold. The data can be recorded for learning, adjustment of the threshold, modifications of offers, etc.

If the confidence value for an offer was determined to exceed the offer threshold at block 411, then the offer is presented at block 413. Examples of presenting an offer include displaying the offer on a wagering game machine display, sending a notification via text messaging to the patron, etc.

Figure 5:
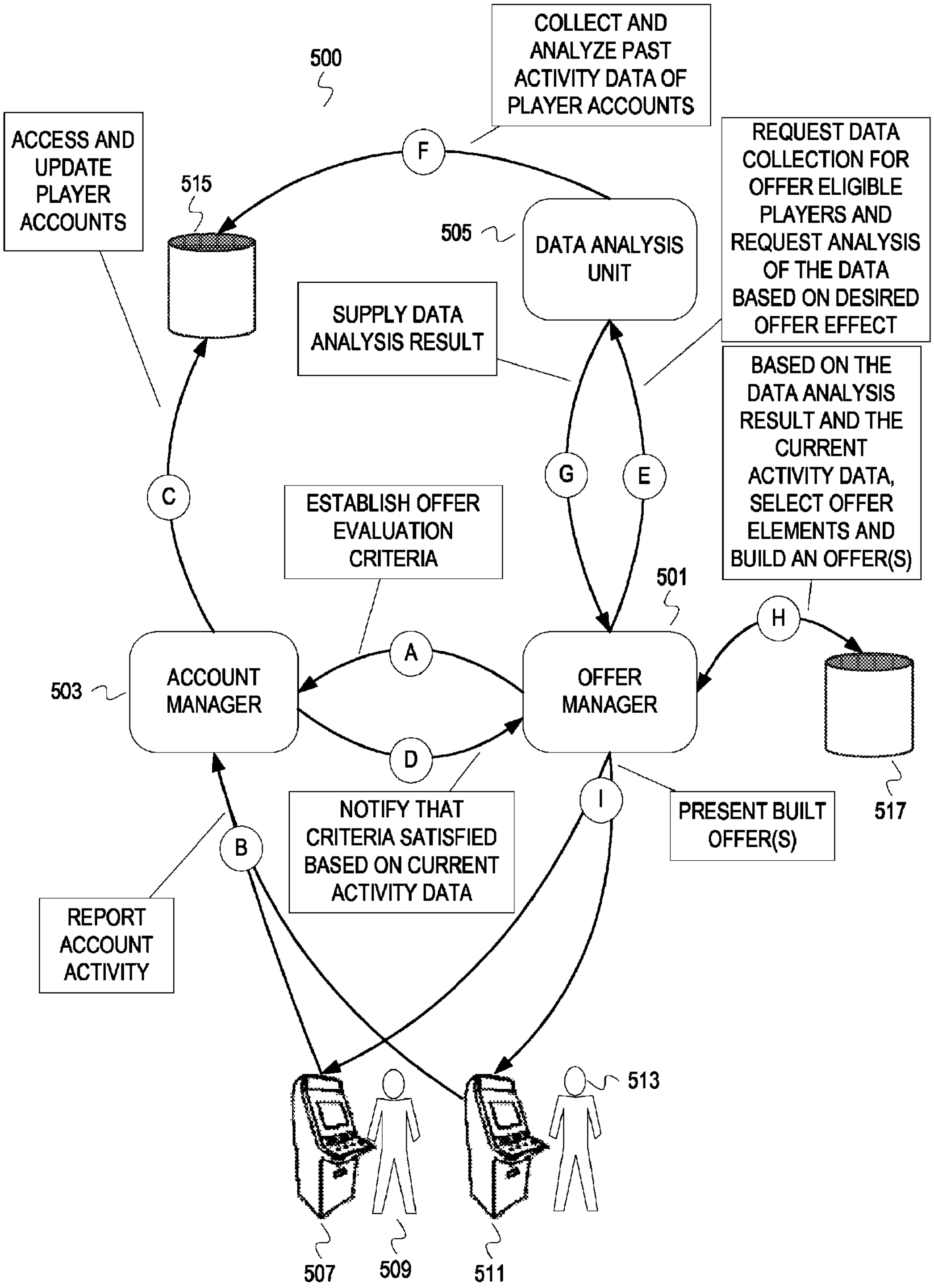
FIG. 5 depicts an example conceptual diagram of a wagering game establishment system building an offer based on a current context and past activity data.

FIG. 5 depicts an example conceptual diagram of a wagering game establishment system building an offer based on a current context and past activity data. FIG. 5 depicts a wagering game establishment system 500 comprised of an account manager 503, an offer manager 501, a data analysis unit 505, a store 515 of player account data, and a store/library of offer elements 517. The system 500 can be implemented in one device, across multiple devices (e.g., several servers in a network), and various permutations thereof. For instance, a first computer in a network can embody the account manager 503, a second computer in the network can embody the offer manager 501, and a third computer can embody the data analysis unit 505. In FIG. 5, the account manager 503 and the data analysis unit have access to the store 515. Various embodiments can configure access differently and/or utilize intermediaries for various reasons, such as increased security. Similarly, the offer manager 501 is depicted as having access to the store 517, although various configurations and security scenarios are possible.

In FIG. 5, stages A-G are similar to stages A-G of FIGS. 1 and 3. At a stage A, the offer manager 501 establishes offer evaluation criteria with the account manager 503.

At stage B, electronic wagering game machines 507 and 511 report current activity data by respective patrons 509 and 513 to the account manager 503.

At stage C, the account manager 503 updates the appropriate player accounts in the store 515. The account manager 503 accesses the store 515 (e.g., establishes a secure communication channel with the store or a server that manages the store 515). The account manager updates the player accounts of the patrons 509, 513 to indicate the reported activities.

At stage D, the offer manager 501 is notified that offer evaluation criteria established at stage C are satisfied by activity of at least one of the patrons 509, 513. Since the offer evaluation criteria have been satisfied for one or more corresponding offers, the offer manager 501 initiates operations to evaluate whether the corresponding offers should be presented to the patron(s) who performed the activities that satisfied the criteria, or offered to friends/acquaintances thereof.

At stage E, the offer manager 501 requests a data analysis unit 505 to collect data for offer eligible players and requests the data analysis unit 505 to analyze the collected data based on a desired effect parameter. Assuming that the patron 509 satisfied the offer evaluation criteria for an offer, the offer manager 501 requests collection of past activity data from the player account of the patron 509.

At stage F, the data analysis unit 505 collects and analyzes the past activity data of player accounts in accordance with the request from the offer manager 501.

At stage G, the data analysis unit 505 supplies the data analysis result to the offer manager 501.

At stage H, the offer manager 501 accesses the store 517 and selects offer elements to build an offer(s) based on the analysis result. The offer manager 501 selects the offer elements based on the data analysis result and current activity data.

At stage I, a built offer(s) is presented to at least one of the patrons 509, 513.

Figure 6:
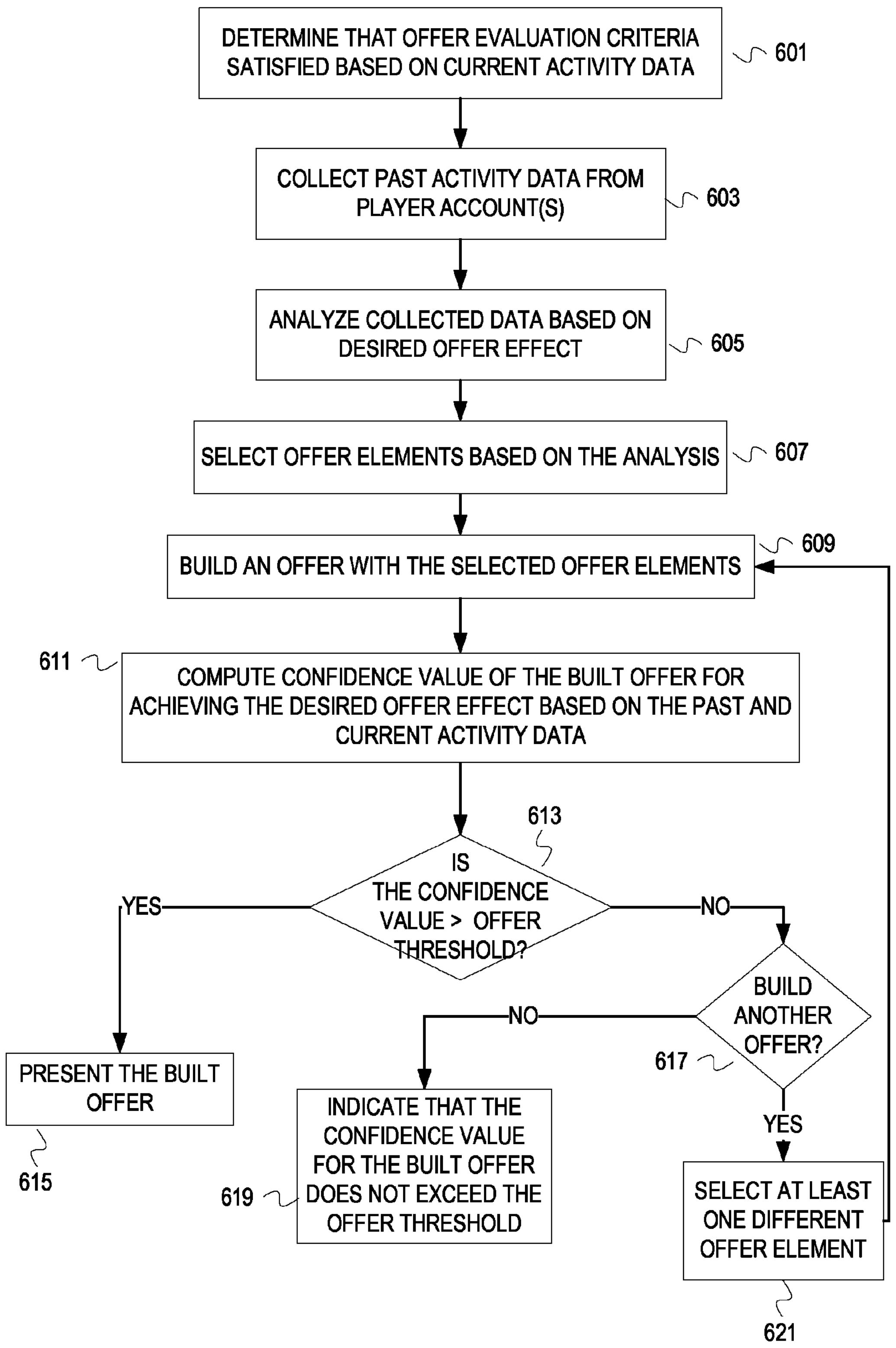
FIG. 6 depicts a flowchart of example operations for building an offer based on a current context of a patron and past activity data.

FIG. 6 depicts a flowchart of example operations for building an offer based on a current context of a patron and past activity data. At block 601, it is determined that offer evaluation criteria have been satisfied based on current activity data.

At block 603, past activity data is collected from a player account(s). Examples of collecting past activity data in addition those already given include collecting all or a portion of the past activity data that has been tagged with context labels that correspond to the desired offer affect and the current activity data, and is not limited to the patron who may be presented an offer. For instance, the current activity data may indicate that a patron is visiting the wagering game establishment with a tour group, and currently playing the Lucky Penny™ wagering game. The wagering game establishment system can collect for analysis past activity data of the patron and/or other members of the tour group who have visited previously, and filter the past activity data for the patron with a tag associated with the Lucky Penny wagering game.

At block 605, the collected data is analyzed based on a desired offer effect. For instance, the collected data is analyzed for patterns and/or trends that have at least some likelihood to lead to the desired offer effect, and correlated with current activity data.

At block 607, offer elements are selected based on the analysis. Various implementations are possible for offer elements. For instance, templates for a hospitality type offer and a wagering game type offer may be available based on the data analysis result and current context. Each of the templates indicates particular elements. Assuming the data analysis result suggests that the hospitality type offer template is most appropriate, then the wagering game establishment system selects the hospitality type offer template. The hospitality type offer template indicates a series of element selections to be made. First, the template can be for a beverage, a meal, a show, or lodging. For this example, the system selects beverage. The system then selects one of a multiple elements to define a particular beverage based on the data analysis result. The system then selects an offer element that indicates a degree of the offer (e.g., half-off, free, buy one get one free, etc.). Embodiments are not limited to template driven offer elements. Embodiments can select generic offer elements. For example, the system can first select an offer element of "offer subject." Based on the data analysis result, the system can define this element as show tickets. The system can also select offer elements "number of offer subjects" and "offer degree." Based on the data analysis result and current context, the system can define these elements as "2" and "one upgrade level," respectively.

At block 609, an offer is built with the selected offer elements. For instance, the selected elements are used to define values of an offer object.

At block 611, a confidence value is computed for the built offer. The confidence value represents confidence/likelihood of achieving the desired offer effect based on the analysis of the past activity data in the context of the current activity data. For example, the confidence value could be a function of the similarity of particular patterns found in the past activity data with the current context and number instances of the particular patterns that resulted in an outcome event at least substantially similar to the desired offer effect with respect to the total number of instances of the particular patterns.

At block 613, it is determined if the confidence value is greater than an offer threshold. Establishments can configure an offer threshold to balance the expense of offers against likelihood of some return on the offer. If the confidence value for the built offer does not exceed the offer threshold, then control flows to block 617. If the confidence value for the built offer exceeds the offer threshold, then control flows to block 615.

At block 615, the built offer is presented to the patron.

At block 617, it is determined if another offer can/should be built. Other offer elements may be appropriate based on the current context and data analysis result. If another offer can/should be built, then control flows to block 621. If an offer cannot and/or should not be built, then control flows to block 619.

At block 619, it is indicated that the confidence value for the built offer does not exceed the offer threshold. For instance, data is written to the player account that the built offer could not be presented because it did not have a confidence value that exceeded the offer threshold. Embodiments may also keep offer analysis data separate from the player accounts. For example, offer analysis data can be maintained for trend analysis in evaluating why some offers are presented and why others are not presented.

At block 621, at least one different offer element is selected. For example, an offer element that indicates a beverage more expensive than the previously indicated beverage. Embodiments may adjust the offer threshold as a function of the cost of the offer. Control flows from block 621 back to block 609.

Figure 7:
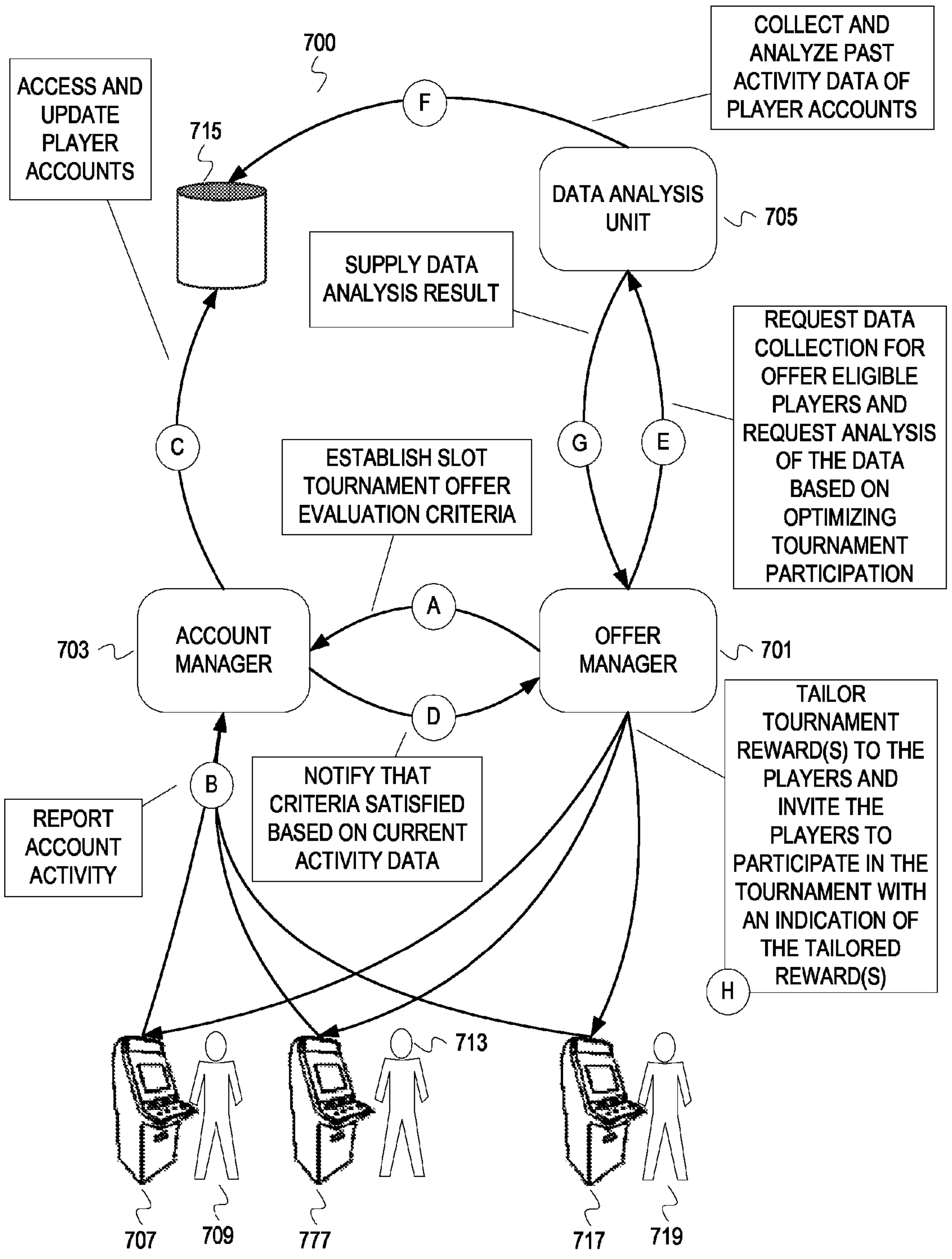
FIG. 7 depicts a conceptual diagram of a wagering game establishment system that offers a tournament to multiple patrons based on current context and past activity data of the multiple patrons.
Figure 8:
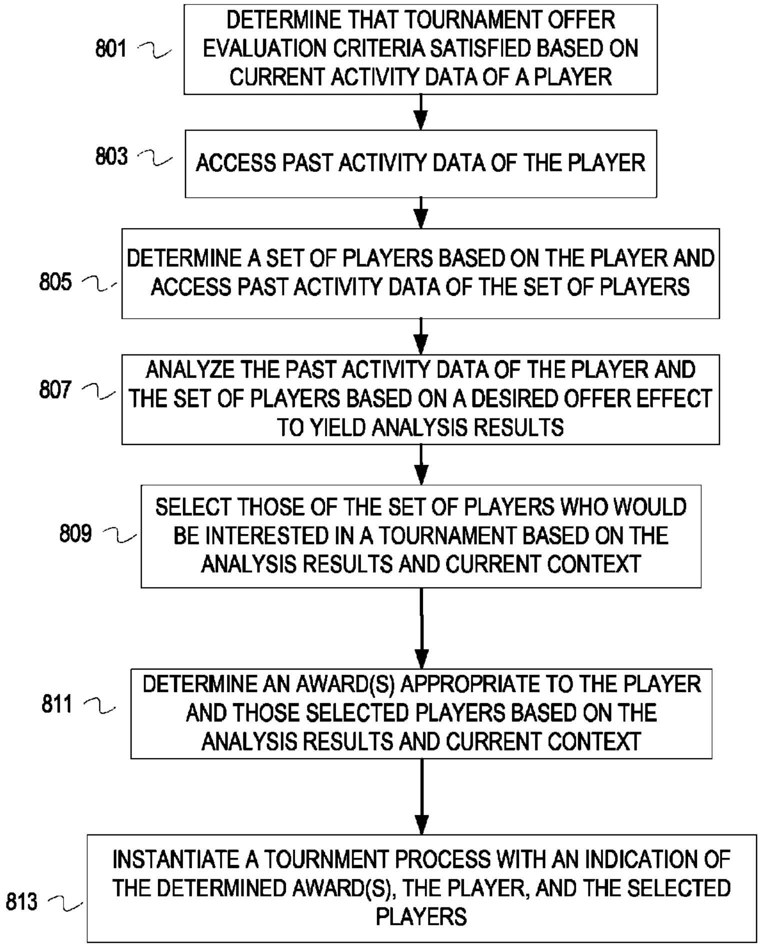
FIG. 8 depicts a flowchart of example operations for generating a tournament offer to multiple players based on current context and past activity data of the multiple players.

As stated earlier, an offer(s) may be presented to a group of patrons and/or be based on current and past activity data of more than one patron. For example, a group of patrons who are friends or visiting with a same tour group may be invited to participate in a tournament. FIGS. 7 and 8 illustrate offers to groups to participate in a tournament.

FIG. 7 depicts a conceptual diagram of a wagering game establishment system that offers a tournament to multiple patrons based on current context and past activity data of the multiple patrons. A system 700 comprises an offer manager 701, an account manager 703, a data analysis unit 705, and a store 715 of past activity data/player accounts. The system 700 is in communication with electronic wagering game machines 707, 777, and 717, via a network (e.g., Ethernet network, wireless network, combination of networks, etc.). Patrons 709, 713, and 719 are at respective electronic wagering game machines 707, 777, and 717.

At a stage A, the offer manager 701 establishes offer evaluation criteria with the account manager 703. For instance, the offer manager 701 instantiates processes that monitor current activity data reported to the account manager 703 for satisfaction of the following criteria: 1) more than three patrons indicated as associated with each other (e.g., a friends circle, players/patrons that share an affinity for a certain game or types of games as represented by data, players that have wagered a certain amount in a certain amount of time, etc.) are concurrently playing, 2) the patrons have played for at least 30 minutes, and 3) the patrons have wagered a certain amount on each visit to the wagering game establishment. The data of other players can be configured and stored with the patron data, referenced by the patron data, determined dynamically based on affinity criteria (i.e., criteria for that represents similar interests/tastes), etc.

At stage B, the electronic wagering game machines 707, 777, 717 report current activity data by the corresponding patrons 709, 713, 719 to the account manager 703.

At stage C, the account manager 703 updates the appropriate player accounts in the store 715. The account manager 703 accesses the store 715 (e.g., establishes a secure communication channel with the store or a server that manages the store 715). The account manager 703 updates the player accounts of the patrons 709, 713, 719 to indicate the reported activities.

At stage D, the offer manager 701 is notified that offer evaluation criteria established at stage C are satisfied by activity of the patrons 709, 713, 719. Since the offer evaluation criteria have been satisfied for a tournament offer, the offer manager 701 initiates operations to evaluate whether the tournament offer should be presented to the patrons who performed the activities that satisfied the criteria, and how the tournament offer can be tailored to the patrons as a group and/or individually.

At stage E, the offer manager 701 requests a data analysis unit 705 to collect data for the patrons 709, 713, 719 and requests the data analysis unit 705 to analyze the collected data based on a desired offer effect of the patrons 709, 713, 719 participating in the tournament.

At stage F, the data analysis unit 705 collects and analyzes the past activity data of player accounts in accordance with the request from the offer manager 701. For instance, the data analysis unit 705 can instantiate four processes. Three processes can collect and analyze past activity data of the patrons, while a fourth aggregates, normalizes, and/or correlates the data across the patrons. The data analysis unit 705 does not necessarily perfunctorily collect and analyze in accordance with the request from the offer manager 701. The data analysis unit 705 can deviate from the request as a function of any one or more of current work load, network traffic, state of the store 715, tags on a player account (e.g., one of the patrons has been tagged as a patron of interest), amount of available past activity data, etc.

At stage G, the data analysis unit 705 supplies the data analysis result to the offer manager 701.

At stage H, the offer manager tailors a tournament reward (s) to the players and invites the players to participate in the tournament based on the current context and data analysis result. For instance, the data analysis result may indicate that the patron 713 will more likely participate in the tournament if the patron 709 has already accepted the tournament invitation. The data analysis result may also indicate that the patron 719 prefers a hospitality type reward (e.g., a free snack from the room refrigerator). Hence, the offer manager 701 tailors the tournament invitation to the patron 719 to indicate a hospitality reward. The offer manager 701 times the tournament invitation to the patron 713 to be send after the patron 709 accepts the invitation to participate in the tournament. Embodiments can also allow a player to extend the tournament offer to additional players (e.g., a player next to the invited player, a friend known to be in the wagering game establishment, etc.). A player can extend the tournament offer via a cell phone (e.g., entering a cell phone number into an invitation addition interface), through a communication portal on the electronic wagering game machine (e.g., using a player identifier), with a text message (e.g., sending a tournament invite code), etc.

FIG. 8 depicts a flowchart of example operations for generating a tournament offer to multiple players based on current context and past activity data of the multiple players. At block 801, it is determined that tournament offer evaluation criteria have been satisfied based on current activity of a player(s).

At block 803, past activity data of the player is accessed.

At block 805, a set of players is determined based on the player. For instance, the set of players may be registered as fellow members of a tour. As another example, the player account of the player may indicate a circle of friends who often accompany the player to the wagering game establishment. In addition, embodiment can search player accounts of active players for past activity that substantially overlaps with the player.

At block 807, past activity data of the player and the set of players is analyzed based on a desired offer effect of at least a given number of players participating in the tournament. The analysis yields an analysis result.

At block 809, those of the set of player who would be interested in a tournament based on the analysis result and current context are selected.

At block 811, an award(s) appropriate to the player and the selected players is determined based on the analysis result and current context. For example, the most appropriate award with the highest likelihood of achieving the desired offer effect may be to offer upgraded show tickets to the player and the selected players to attend a show together.

At block 813, a tournament process is instantiated with an indication of the determined award(s), the player, and the selected players. For instance, the offer manager informs a server responsible for managing impromptu tournaments of the award(s) to be given and all of the players. As another example, the offer manager can invoke a process to handle invitation and registration of participants of a tournament, and then pass that information to the process/server handling the impromptu tournament.

It should be understood that the flowcharts depict example operations, and that embodiments are not limited to those operations. Embodiments can perform operations in parallel, perform operations in a different order, perform fewer operations, and perform additional operations. To illustrate with respect to FIGS. 2, 4, and 6, additional operations can be performed prior to or in parallel with respective blocks 203, 403, and 603. For instance, offers may be limited to patrons who are members of a particular club, who have been playing for at least an hour, who have wagered a particular amount, etc. With respect to FIG. 6, additional operations can be performed to build multiple offers with selected offer elements and compute confidence values for the multiple built offers. Additional operations can also be performed to select one or more of the built offers with the highest confidence values. Operations can also be performed to rank all of the available offers or built offers. In FIG. 4, operations can be performed to modify the selected offer to generate multiple variations for that selected offer. In embodiments, the operations can be performed by executing instructions residing on machine-readable media (e.g., software), while in other embodiments, the operations can be performed by hardware and/or other logic (e.g., firmware). Further, embodiments are not limited to operations offering a tournament offer to a group of players/patrons. Embodiments can present non-tournament offers to a set of players/patrons, and embodiments are not limited to offering only to those players/patrons who satisfy offer criteria. Embodiments can determine that a first set of players/patrons satisfy offer criteria and present the offer to a second set of players/patrons. Embodiments can present an offer to a set of players/patrons after determining that a subset of the set of players/patrons satisfy the offer criteria.

Wagering Game Machine Architectures

Figure 9:
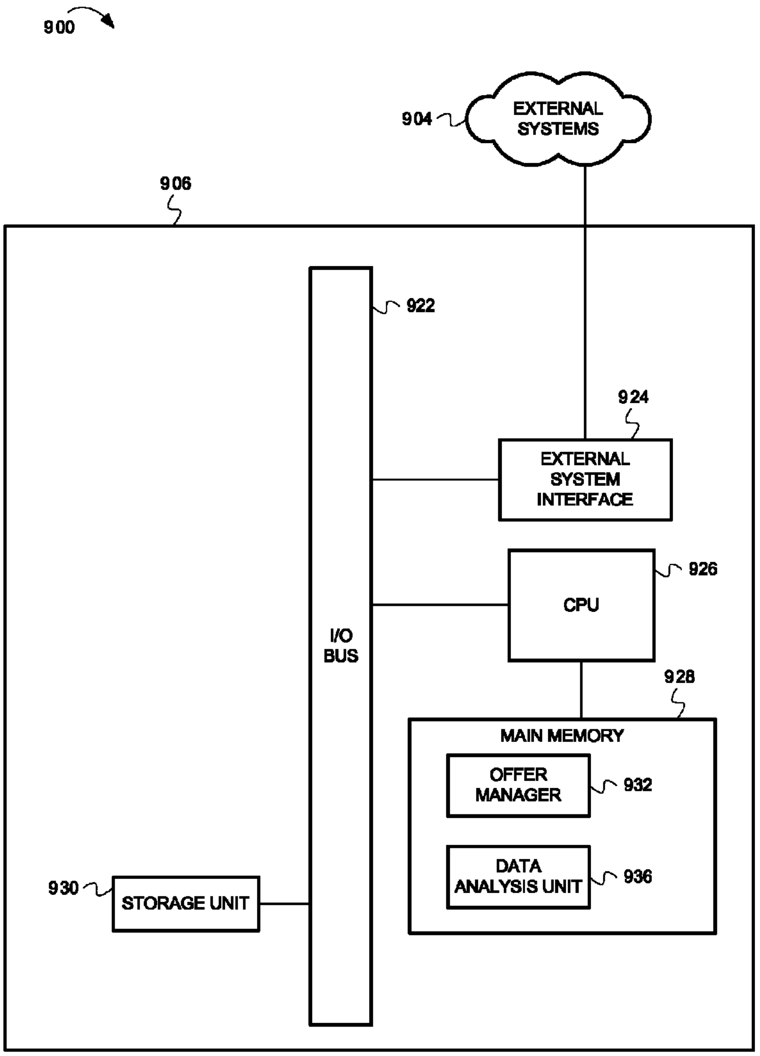
FIG. 9 is a block diagram illustrating a wagering game server architecture, according to example embodiments.

FIG. 9 is a block diagram illustrating a wagering game server architecture, according to example embodiments. As shown in FIG. 9, the wagering game server architecture 900 includes a wagering game server 906, which includes a central processing unit (CPU) 926 connected to main memory 928. The CPU 926 can include any suitable processor, such as an Intel® processor, AMD processor, UltraSPARC processor, PowerPC® processor, etc. The main memory 928 includes an offer manager 932. The offer manager 932 operates to establish offer criteria, and present offers based on analysis of current activity data and correlated past activity data. The main memory 928 also includes a data analysis unit 936. The data analysis unit 936 operates to collect and analyze data requested by the offer manager 932, and operates to provide results of the analysis to the offer manager 932. The offer manager 932 presents offers based on current context and the analysis results.

The CPU 926 is also connected to an input/output (I/O) bus 922, which can include any suitable bus technologies, such as an AGTL+ frontside bus and a PCI backside bus. The I/O bus 922 is connected to a storage unit 930. The I/O bus 922 is also connected to an external system interface 924, which is connected to external systems 904 (e.g., wagering game networks).

In one embodiment, the wagering game server 906 can include additional peripheral devices and/or more than one of each component shown in FIG. 9. For example, in one embodiment, the wagering game server 906 can include multiple external system interfaces 924 and/or multiple CPUs 926. In one embodiment, any of the components can be integrated or subdivided.

Any component of the architecture 900 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 9 describes an example wagering game server architecture, this section continues with a discussion wagering game networks.

Wagering Game Networks

Figure 10:
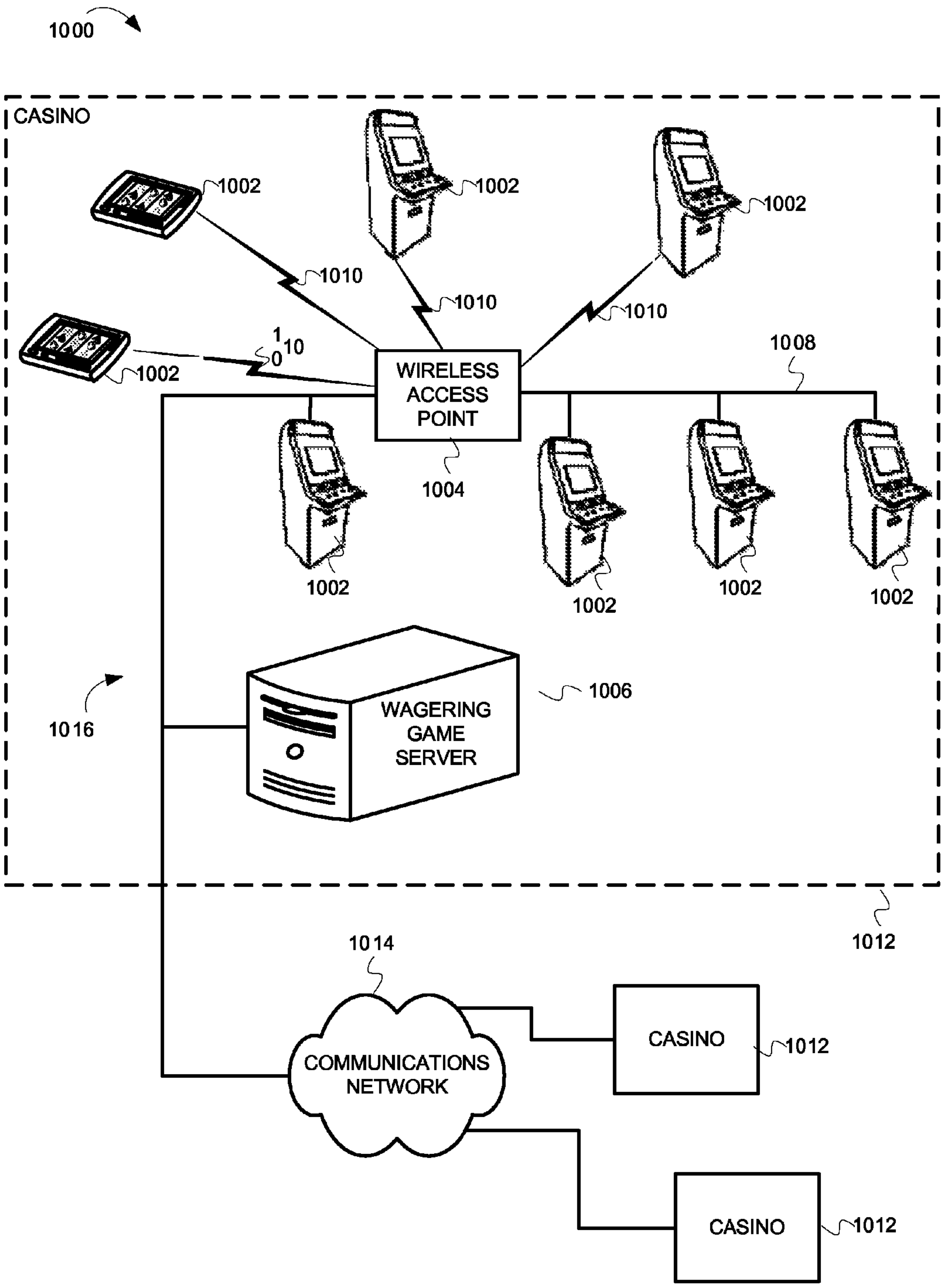
FIG. 10 is a block diagram illustrating a wagering game network 1000, according to example embodiments.

FIG. 10 is a block diagram illustrating a wagering game network 1000, according to example embodiments. As shown in FIG. 10, the wagering game network 1000 includes a plurality of casinos 1012 connected to a communications network 1014.

Each casino 1012 includes a local area network 1016, which includes an access point 1004, a wagering game server 1006, and wagering game machines 1002. The access point 10304 provides wireless communication links 1010 and wired communication links 1008. The wired and wireless communication links can employ any suitable connection technology, such as Bluetooth, 802.11, Ethernet, public switched telephone networks, SONET, etc. In some embodiments, the wagering game server 1006 can serve wagering games and distribute content to devices located in other casinos 1012 or at other locations on the communications network 1014.

The wagering game machines 1002 described herein can take any suitable form, such as floor standing models, handheld mobile units, bartop models, workstation-type console models, etc. Further, the wagering game machines 1002 can be primarily dedicated for use in conducting wagering games, or can include non-dedicated devices, such as mobile phones, personal digital assistants, personal computers, etc. In one embodiment, the wagering game network 1000 can include other network devices, such as accounting servers, wide area progressive servers, player tracking servers, and/or other devices suitable for use in connection with embodiments of the invention.

In some embodiments, wagering game machines 1002 and wagering game servers 1006 work together such that a wagering game machine 1002 can be operated as a thin, thick, or intermediate client. For example, one or more elements of game play may be controlled by the wagering game machine 1002 (client) or the wagering game server 1006 (server). Game play elements can include executable game code, lookup tables, configuration files, game outcome, audio or visual representations of the game, game assets or the like. In a thin-client example, the wagering game server 1006 can perform functions such as determining game outcome or managing assets, while the wagering game machine 1002 can present a graphical representation of such outcome or asset modification to the user (e.g., player). In a thick-client example, the wagering game machines 1002 can determine game outcomes and communicate the outcomes to the wagering game server 1006 for recording or managing a player's account.

In some embodiments, either the wagering game machines 1002 (client) or the wagering game server 1006 can provide functionality that is not directly related to game play. For example, account transactions and account rules may be managed centrally (e.g., by the wagering game server 1006) or locally (e.g., by the wagering game machine 1002). Other functionality not directly related to game play may include power management, presentation of advertising, software or firmware updates, system quality or security checks, etc. In addition, the wagering game server 1006 operates to tailor offers to patrons based on current context and past activity data of the patrons.

Any of the wagering game network components (e.g., the wagering game machines 1002) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

detecting, by a wagering game machine, a physical item associated with monetary value;

creating, in a non-transitory memory device, a credit balance based on the monetary value;

detecting, via the wagering game machine, a wager on a wagering game based on the credit balance;

determining a result for the wagering game;

processing, via the wagering game machine, the wager based on the result;

reporting, over a network by the wagering game machine, one or more of the wager or the result as current wagering game establishment activity data for a player of the wagering game;

determining that the current wagering game establishment activity data of the player satisfies wagering game establishment offer evaluation criteria;

accessing, over a network, past activity data of the player at least partially in response to said determining that the current wagering game establishment activity data of the player satisfies the wagering game establishment offer evaluation criteria;

analyzing the past activity data based, at least in part, on a desired effect and the current wagering game establishment activity data to generate an analysis result;

computing likelihood that at least one of a set of offers can achieve the desired effect based, at least in part, on the analysis result;

selecting a first of the set of offers based, at least in part, on said computing the likelihood that at least one of the set of offers can achieve the desired effect; and presenting the selected first offer to the player.

2. The method of claim 1, wherein said computing the likelihood that at least one of the set of offers can achieve the desired effect based, at least in part, on the analysis result comprises:

computing confidence values for the set of offers based on the desired effect and the analysis result, wherein the confidence values represent the likelihood that respective ones of set of offers can achieve the desired effect if provided.

3. The method of claim 2, wherein said selecting the first of the set of offers comprises determining that the first of the set of offers has a greatest of the confidence values.

4. The method of claim 3 further comprising determining that a first of the set of confidence values exceeds a confidence value threshold, wherein the first confidence value corresponds to the first offer.

5. The method of claim 1, wherein said analyzing the past activity data based, at least in part, on a desired effect and the current wagering game establishment activity data to generate the analysis result comprises:

determining a plurality of same or similar series of wagering game establishment activities in the past activity data that suggest a pattern of activity; and determining if the pattern of activity correlates with the desired effect in a context of the current wagering game establishment activity data.

6. The method of claim 1, wherein said analyzing the past activity data based, at least in part, on a desired effect and the current wagering game establishment activity data to generate the analysis result comprises applying a heuristic to the past activity data and the current wagering game establishment activity data.

7. The method of claim 1 further comprising modifying the first offer based, at least in part, on the analysis result to increase the likelihood that the first offer can achieve the desired effect.

8. The method of claim 7 further comprising determining that the likelihood that the first offer can achieve the desired effect is insufficient, wherein said modifying the first offer is in response to said determining that the likelihood that the first offer can achieve the desired effect is insufficient.

9. The method of claim 1, wherein the current wagering game establishment activity data and the past activity data comprises at least one of wagering game data and non-wagering game data.

10. The method of claim 9, wherein the non-wagering game data comprises at least one of purchasing data, lodging data, companion data, preferred beverage data, preferred food data, and entertainment data.

11. The method of claim 1 further comprising:

determining a set of players associated with the player based, at least in part, on the past activity data of the player;

accessing the past activity data of the set of players;

analyzing the past activity data of the set of players and current wagering game establishment activity data of the set of players;

for each of the set of players, computing a likelihood that the first of the set offers will achieve a second desired effect; and presenting the first of the set of offers to those of the set of players with the likelihood that the first of the set of offers can achieve the second desired effect that surpasses an offer threshold.

12. The method of claim 11, wherein the second desired effect comprises participating in a tournament with the player.

13. A method comprising:

detecting, by a wagering game machine, a physical item associated with monetary value;

creating, in a non-transitory memory device, a credit balance based on the monetary value;

detecting, via the wagering game machine, a wager on a wagering game based on the credit balance;

determining a result for the wagering game;

processing, via the wagering game machine, the wager based on the result;

reporting, over a network by the wagering game machine, current wagering game establishment activity data for a player of the wagering game, wherein the current wagering game establishment activity indicates at least one of the result or the wager;

determining the current wagering game establishment activity satisfies offer evaluation criteria;

analyzing past wagering game establishment activity data of the player, the current wagering game establishment activity data of the player, and a desired offer effect associated with the offer evaluation criteria;

selecting a plurality of offer elements based, at least in part, on said analyzing;

building, with the plurality of offer elements, an offer having a likelihood to achieve the desired offer effect; and presenting the offer to the player.

14. The method of claim 13 further comprising determining that the likelihood surpasses a likelihood threshold for presenting the offer.

15. The method of claim 13 further comprising:

determining that the likelihood of the offer to achieve the desired offer effect is insufficient; and changing at least one of the plurality of offer elements used to build the offer to increase the likelihood that the offer can achieve the desired effect.

16. One or more non-transitory machine-readable media having instructions which, when executed by a processor, cause the processor to perform operations comprising:

detecting, by a wagering game machine, a physical item associated with monetary value;

creating, in a non-transitory memory device, a credit balance based on the monetary value;

detecting, via the wagering game machine, a wager on a wagering game based on the credit balance;

determining a result for the wagering game;

processing, via the wagering game machine, the wager based on the result;

reporting, over a network by the wagering game machine, one or more of the wager or the result as current wagering game establishment activity data for a player of the wagering game;

determining that the current wagering game establishment activity data of the player satisfies wagering game establishment offer evaluation criteria;

accessing, over a network, past activity data of the player at least partially in response to said determining that the current wagering game establishment activity data of the player satisfies the wagering game establishment offer evaluation criteria;

analyzing the past activity data based, at least in part, on a desired effect and the current wagering game establishment activity data to generate an analysis result;

computing likelihood that at least one of a set of offers can achieve the desired effect based, at least in part, on the analysis result;

selecting a first of the set of offers based, at least in part, on said determining the likelihood that at least one of the set of offers can achieve the desired effect; and presenting the selected first offer to the player.

17. The machine-readable media of claim 16 wherein said operation of determining the likelihood that at least one of the set of offers can achieve the desired effect based, at least in part, on the analysis result comprises:

computing confidence values for the set of offers based on the desired effect and the analysis result, wherein the confidence values represent the likelihood that respective ones of set of offers can achieve the desired effect if provided.

18. The machine-readable media of claim 17, wherein said operation of selecting the first of the set of offers comprises determining that the first of the set of offers has a greatest of the confidence values.

19. The machine-readable media of claim 18, wherein the operations further comprise determining that a first of the set of confidence values exceeds a confidence value threshold, wherein the first confidence value corresponds to the first offer.

20. The machine-readable media of claim 16, wherein said operation of analyzing the past activity data based, at least in part, on a desired effect and the current wagering game establishment activity data to generate the analysis result comprises:

determining a plurality of same or similar series of wagering game establishment activities in the past activity data that suggest a pattern of activity; and determining if the pattern of activity correlates with the desired effect in a context of the current wagering game establishment activity data.

21. The machine-readable media of claim 16, wherein the operations further comprise modifying the first offer based, at least in part, on the analysis result to increase the likelihood that the first offer can achieve the desired effect.

22. The machine-readable media of claim 21, wherein the operations further comprise determining that the likelihood that the first offer can achieve the desired effect is insufficient, wherein said modifying the first offer is in response to said determining that the likelihood that the first offer can achieve the desired effect is insufficient.

23. The machine-readable media of claim 16, wherein the current wagering game establishment activity data and the past activity data comprises at least one of wagering game data and non-wagering game data.

24. The machine-readable media of claim 23, wherein the non-wagering game data comprises at least one of purchasing data, lodging data, companion data, preferred beverage data, preferred food data, and entertainment data.

* * * * *